United States Patent
Kimura

(10) Patent No.: US 7,899,604 B2
(45) Date of Patent: Mar. 1, 2011

(54) FUEL-INJECTION-TIMING ADAPTING METHOD AND APPARATUS FOR DIRECT INJECTION ENGINE

(75) Inventor: Masahiko Kimura, Obu (JP)

(73) Assignee: Denso Corporation, Kariya (JP)

( * ) Notice: Subject to any disclaimer, the term of this patent is extended or adjusted under 35 U.S.C. 154(b) by 361 days.

(21) Appl. No.: 12/078,392

(22) Filed: Mar. 31, 2008

(65) Prior Publication Data

US 2008/0281499 A1 Nov. 13, 2008

(30) Foreign Application Priority Data

May 11, 2007 (JP) .............................. 2007-127368

(51) Int. Cl.
*B60T 7/12* (2006.01)
(52) U.S. Cl. .................. 701/105; 123/294; 123/305
(58) Field of Classification Search ......... 701/103–105, 701/114, 115; 123/294, 295, 339.2, 305, 123/481
See application file for complete search history.

(56) References Cited

U.S. PATENT DOCUMENTS

| 5,367,264 | A | 11/1994 | Brabetz | |
|---|---|---|---|---|
| 6,327,531 | B1 | 12/2001 | Philipp et al. | |
| 6,520,167 | B1* | 2/2003 | Kanno | 123/674 |
| 6,675,748 | B2* | 1/2004 | Ancimer et al. | 123/27 R |
| 6,874,480 | B1* | 4/2005 | Ismailov | 123/494 |
| 7,379,810 | B2* | 5/2008 | Soga et al. | 701/104 |
| 2002/0166515 | A1* | 11/2002 | Ancimer et al. | 123/27 R |
| 2007/0175438 | A1* | 8/2007 | Szekely et al. | 123/299 |
| 2007/0193557 | A1* | 8/2007 | Brevick et al. | 123/295 |
| 2007/0193565 | A1* | 8/2007 | Brevick et al. | 123/568.11 |

FOREIGN PATENT DOCUMENTS

| JP | 2002-206456 | 7/2002 |
|---|---|---|
| JP | 2004-263680 | 9/2004 |

* cited by examiner

*Primary Examiner*—John T Kwon
(74) *Attorney, Agent, or Firm*—Nixon & Vanderhye PC

(57) ABSTRACT

A computer simulates a relationship between a fuel-rate of fuel which collides with the cavity of the piston and the fuel injection timing, and/or the relationship between the fuel-rate of fuel which collide with the cylinder inner wall and the fuel injection timing. A range of the fuel injection timing in which the combustion state is stable is computed based on the simulation results. This range of fuel injection timing may be defined as the measuring range in which the measure points are arranged. Furthermore, the fuel injection timing is varied gradually around an upper and lower limit values of the measuring range and the engine torque is measured. The measuring range is corrected so that the combustion state becomes stable.

18 Claims, 5 Drawing Sheets

FUEL-INJECTION-TIMING ADAPTING METHOD AND APPARATUS FOR DIRECT INJECTION ENGINE

CROSS-REFERENCE TO RELATED APPLICATION

This application is based on Japanese Patent Application No. 2007-127368 filed on May 11, 2007, the disclosure of which is incorporated herein by reference.

FIELD OF THE INVENTION

The present invention relates to a fuel-injection-timing adapting method and fuel-injection-timing adaptation apparatus for a direct injection engine.

BACKGROUND OF THE INVENTION

A direct injection engine is provided with a variable valve timing mechanism, an exhaust gas recirculation (EGR) system and the like in order to improve output, reduce exhaust emission, and improve fuel economy. It is necessary to adapt a valve timing and an EGR ratio as well as a fuel injection timing and an ignition timing. Hence, control parameters to be adapted increases and an adaptation operation becomes complicated.

JP-2002-206456A shows that an engine characteristic is measured at predetermined measure points, a model is obtained which defines a relationship between control parameters and the engine characteristic, and adaptation values of the control parameters are computed by use of the model.

JP-2004-263680A shows that design of experiments method is used to reduce the number of measure points with high adaptation accuracy.

Since the number of control parameter to be adapted increases in the direct injection engine, even if the design of experiments method is used, the number of measure point increases to ensure the accuracy of the model. The adaptation operation is still complicated.

In the conventional method, since a combination of the adaptation parameter is difficult to obtain a normal combustion, the combination of the improper adaptation parameter may be included in the measure points arranged with the design of experiments method. As a result, abnormal combustion occurs with the improper combination of the adaptation parameter at the time of adaptation operations, and there is a possibility that the engine is damaged or the engine characteristic changed to deteriorate the model accuracy.

The present invention is made in view of the above matters, it is an object of the present invention to provide fuel-injection-timing adapting method and apparatus for a direct injection engine, which is capable of adapting the fuel injection timing accurately with adaptation operations reduced.

According to the present invention, an engine characteristic data is repeatedly measured by changing a fuel injection timing at a plurality of measure points which are arranged in a predetermined measuring range in order to compute an adaptation value of the fuel injection timing based on measure data at each measure point. A relationship between a behavior of a fuel spray injected into a cylinder through a fuel injector and a fuel injection timing is simulated based on design data of the engine and the fuel injector, and the measuring range of the fuel injection timing is refined based on a simulation result.

A fuel-spray behavior of the fuel injected into the cylinder through the fuel injector 13 is a major factor to obtain a stable combustion state. A computer simulates a relationship between the fuel-spray behavior and the fuel injection timing based on design data of the engine and the fuel injector. Based on the simulation result, a range where the combustion state deteriorates is excluded from the measuring range of fuel injection timing, and the measuring range of fuel injection timing is refined to the range in which the combustion state becomes stable. Hence, the fuel injection timing is effectively adapted.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

An embodiment of the present invention will be described hereinafter.

Figure 1:
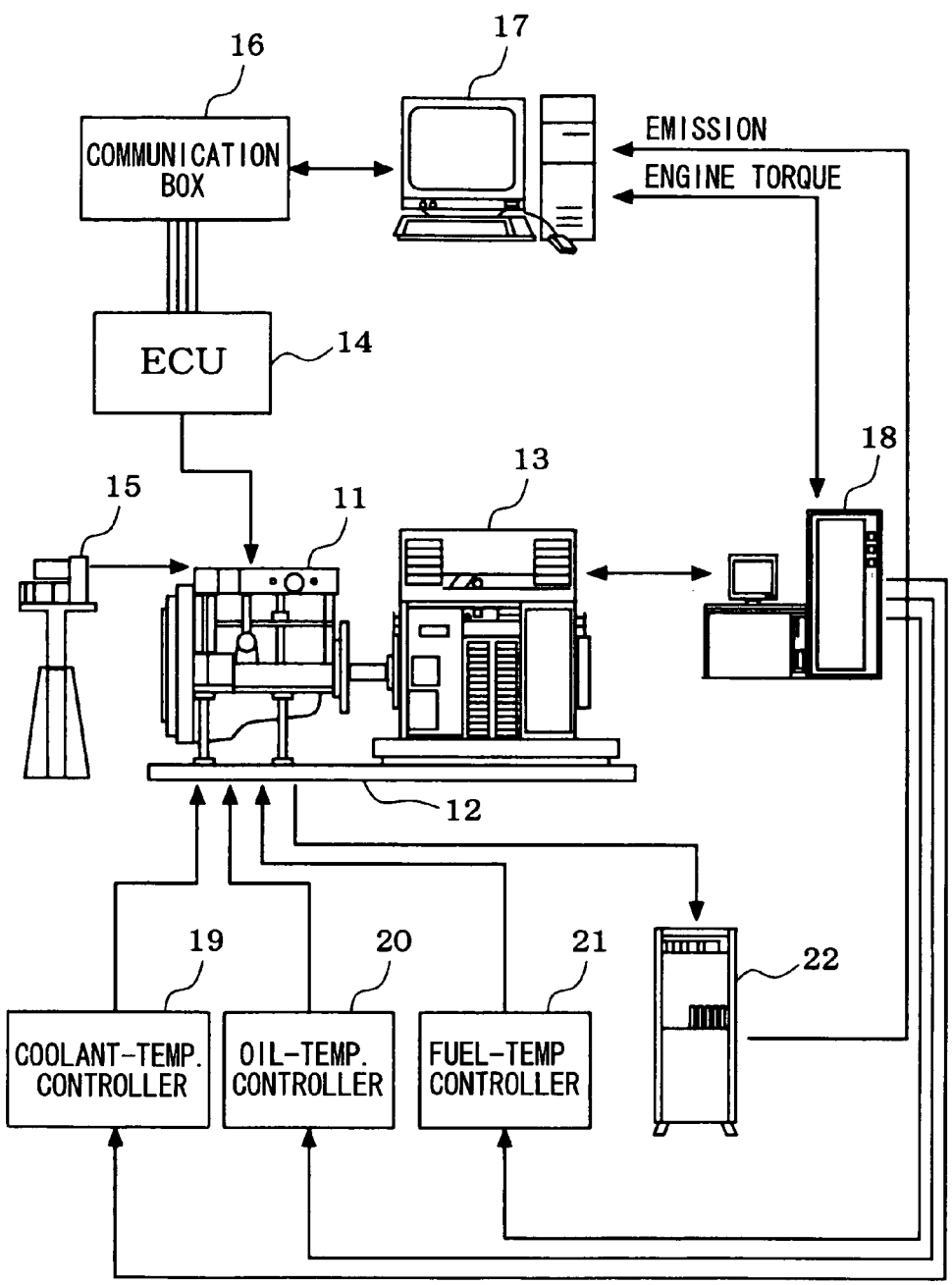
FIG. 1 is a schematic view showing a fuel-injection-timing adaptation apparatus according to an embodiment of the present invention.

Referring to FIG. 1, a fuel-injection-timing adaptation apparatus is explained.

A direct injection engine 11 is attached on a bench 12, and a crankshaft of the engine 11 is connected to a dynamometer 13. During adaptation operations, an electronic control unit (ECU) 14 controls various kinds of actuators equipped on the engine 11. The ECU 14 is electrically connected to an adaptation-control computer 17 through a communication box 16. Control signals is transmitted from the adaptation-control computer 17 to the ECU 14 through the communication box 16, whereby map constants of each control parameter stored in the ECU 14 are altered. A throttle position during the adaptation operation is adjusted by a throttle-controller 15.

During the adaptation operations, the dynamometer 13 and the throttle-controller 15 are controlled by a dynamometer controller 18 to control an engine load. Signals indicative of engine torque (engine characteristic data) measured by the dynamometer 13 are transmitted to the adaptation-control computer 17. The engine 11 is electrically connected to a coolant-temperature controller 19, an oil-temperature controller 20, and a fuel temperature controller 21. During the adaptation operation, the coolant temperature, oil temperature and fuel temperature are kept constant by these controllers 19, 20, and 21. Exhaust gas discharged from the engine 11 during the adaptation operations is analyzed by the exhaust-gas analyzer 22, and the result of a measurement of emission, such as NOx, CO, HC, etc. in the exhaust gas, is transmitted to the adaptation-control computer 17.

Figure 2:
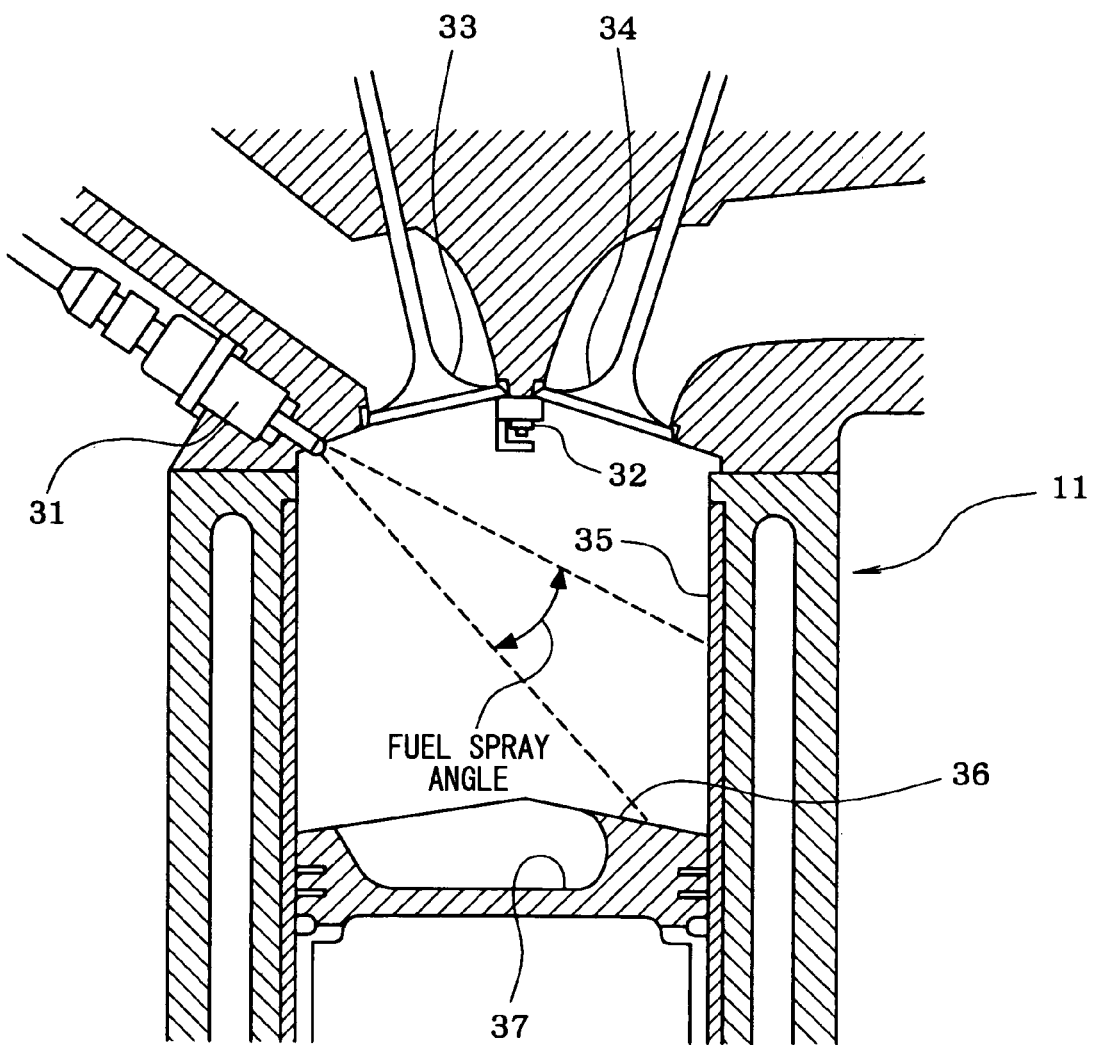
FIG. 2 is a cross sectional view showing a combustion chamber of a direct injection engine and its vicinity.

Generally, the engine control parameters used as objects for adaptation are, for example, fuel injection timing of a fuel injector 31 shown in FIG. 2, engine load (intake air quantity), engine speed, ignition timing of the ignition plug 32, opening degree of the throttle valve driven by a motor (not shown), ignition timing of the ignition plug 32, opening degree of a swirl control valve (SCV opening degree), advanced value of the intake vale 33 and the exhaust valve 34 by a variable valve timing mechanism, opening degree of an EGR valve, and the like. In this embodiment, the fuel injection timing is adapted. A way of adapting the fuel injection timing is described hereinafter.

The adaptation-control computer 17 arranges the measure point of the predetermined number using the design of experiments method (DOE), models the characteristic of the engine 11 based on the measurement data of each measure point, and calculates an adaptation value of fuel injection timing to obtain an optimal engine performance. In this case, in order to decrease the number of the measure points and to perform the adaptation operations of fuel injection timing efficiently, the range where the combustion state deteriorates is excluded from the measuring range (range which arranges the measure point) of fuel injection timing, and the measuring range of fuel injection timing is refined to the range in which the combustion state becomes stable.

A fuel-spray behavior of the fuel injected into the cylinder through the fuel injector 13 is a major factor to obtain a stable combustion state. The adaptation-control computer 17 simulates a relationship between the fuel-spray behavior and the fuel injection timing based on design data of the engine 11 and the fuel injector 31. The design data include a fuel spray angle, a mounting angle of the fuel injector 31, a distance between the fuel injector 31 and a piston 36 in a height direction for every crank angle, an inner diameter of the cylinder, a position of a cavity 37 and the like. Based on the simulation result, the measuring range is refined to the range in which the combustion state is stable.

Figure 3:
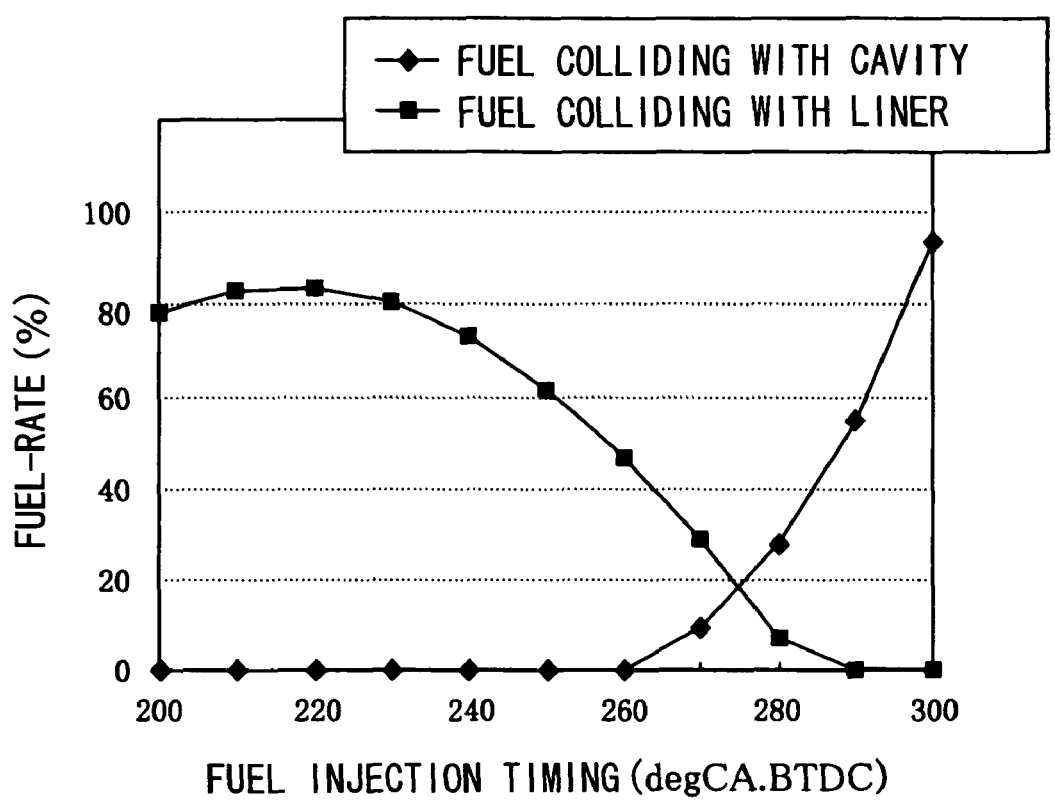
FIG. 3 is a graph showing simulation results of fuel-rate of fuel colliding with the liner and the cavity.
Figure 4A:
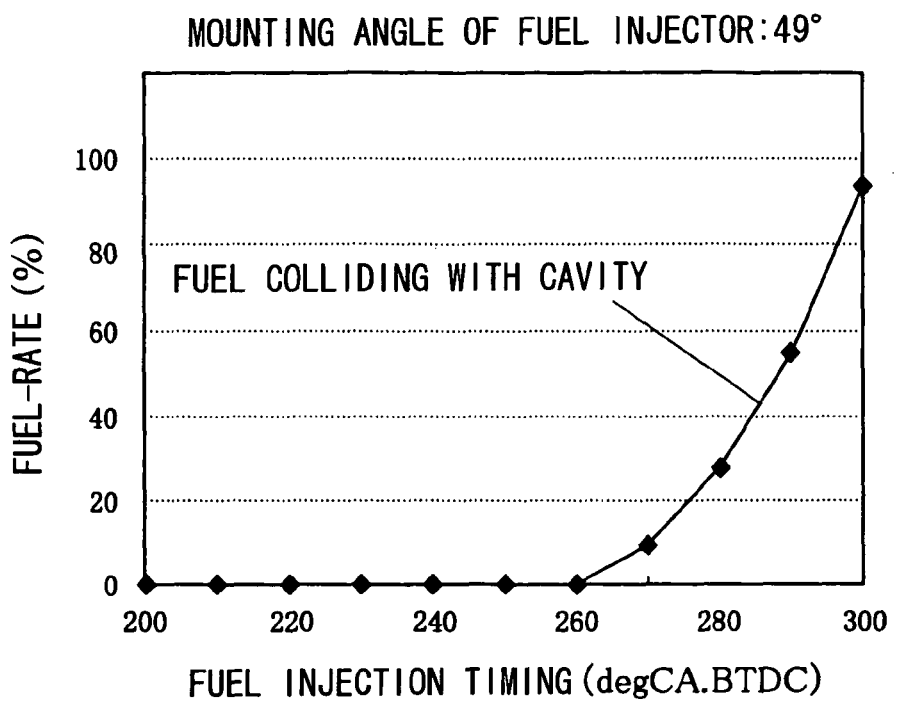
FIGS. 4A and 4B are graphs showing simulation results of fuel-rate of fuel which collides with a cavity on a top surface of a piston in engines each of which is different in the mounting angle of the fuel injector.
Figure 4B:
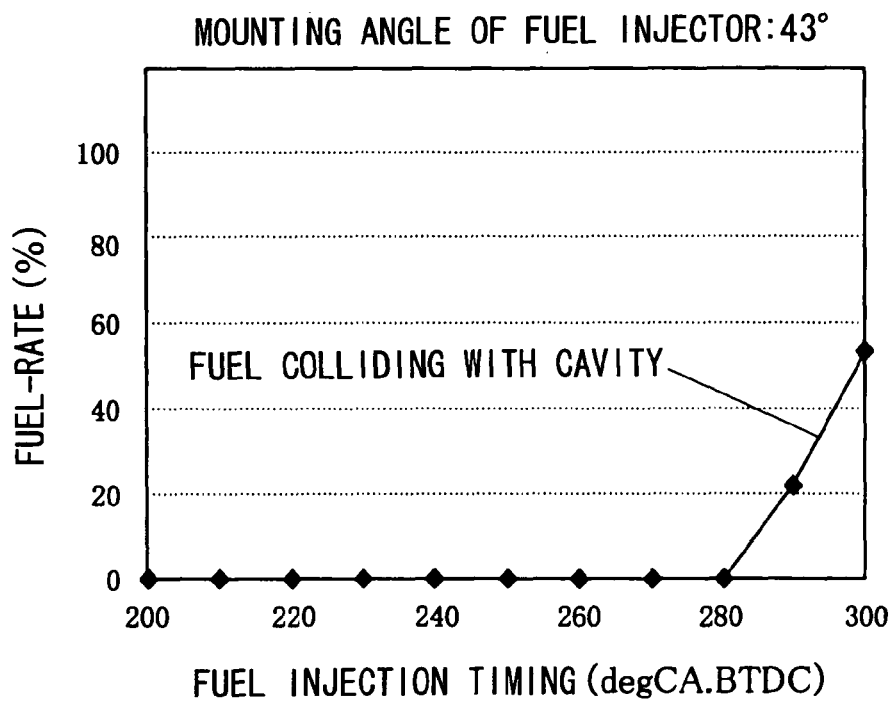

When the computer 17 simulates the relationship between the fuel-spray behavior and the fuel injection timing, the computer 17 also simulates a relationship between a fuel-rate of fuel which collide with the cavity 37 of the piston 36 and the fuel injection timing, and/or the relationship between the fuel-rate of fuel which collide with the cylinder inner wall (liner 35) and the fuel injection timing. If the fuel spray angle, the mounting angle of the fuel injector 32 (fuel injection direction), the distance between the fuel injector 31 and the piston 36, the inner diameter of the cylinder, and the position of the cavity 37 are obtained, the fuel-rate of fuel colliding with the cavity 37 and the fuel-rate of fuel colliding with the liner 35 can be calculated based on a geometric relationship. FIGS. 3, 4A and 4B show simulation results of the fuel-rate of fuel colliding with the liner 35 and the cavity 37

As shown in FIGS. 2 and 3, as the fuel-rate of fuel colliding with the cavity 37 increases, the fuel-rate of fuel colliding with the liner 35 decreases. When the fuel-rate of fuel colliding with the liner 35 excessively increases, the combustion state deteriorates. When the fuel-rate of fuel colliding with the cavity 37 excessively decreases, the combustion state deteriorates.

Generally, when the fuel-rate of fuel colliding with the cavity 37 is in a range of 20-30%, the combustion state is stable. When out of the range, the combustion state deteriorates. When the computer 17 adapts the fuel injection timing, the computer 17 computes a range of fuel injection timing in which the fuel-rate of fuel colliding with the cavity 37 is in a range of 20-30% based on the simulation results, for example, shown in FIG. 3. This range of fuel injection timing is defined as the measuring range in which the measure points are arranged in the design of experiments method.

Alternatively, the fuel-rate of fuel colliding with the liner 35 is simulated to obtain a range of the fuel-rate of fuel in which the combustion state is stable. A range of the fuel injection timing corresponding to this range of the fuel-rate of fuel is computed based on the simulation results. This range of fuel injection timing may be defined as the measuring range in which the measure points are arranged.

Alternatively, the computer 17 simulates both the fuel-rate of fuel which collide with the cavity 37 and the fuel-rate of fuel which collide with the liner 35. Both fuel-rates in which the combustion state is stable are obtained to computes a range of the fuel injection timing corresponding to both fuel-rates based on the simulation results shown in FIG. 3. This range of fuel injection timing may be defined as the measuring range in which the measure points are arrange in the design of experiment method.

As shown in FIGS. 4A and 4B, the relationship between the fuel-rate of fuel colliding with the cavity 37 and fuel injection timing and the relationship between the fuel-rate of fuel colliding with the liner 35 and the fuel injection timing are varied among the engines having different design data, such as the mounting angle of the fuel injector 31. The fuel-rate in which the combustion is stable is not varied even if the design data of the engine 11 are different.

In consideration of this point, the data of the fuel-rate in which the combustion is stable are stored in a memory of the computer 17 as physical information for defining the measuring rage of the fuel injection timing. When the computer 17 refines the measuring range of the fuel injection timing of an engine having a different design data, the measuring range of the fuel injection timing can be refined based on the physical information and the simulation data. With this, as shown in FIGS. 4A and 4B, the fuel injection timings of engines having different mounting angles of the fuel injector 31 can be accurately adapted with adaptation steps reduced.

Since tolerance arises not a little in the simulation results shown in FIGS. 3, 4A and 4B, the combustion state may deteriorate near the upper and lower values of the measuring range of fuel injection timing refined based on the simulation result.

Figure 5:
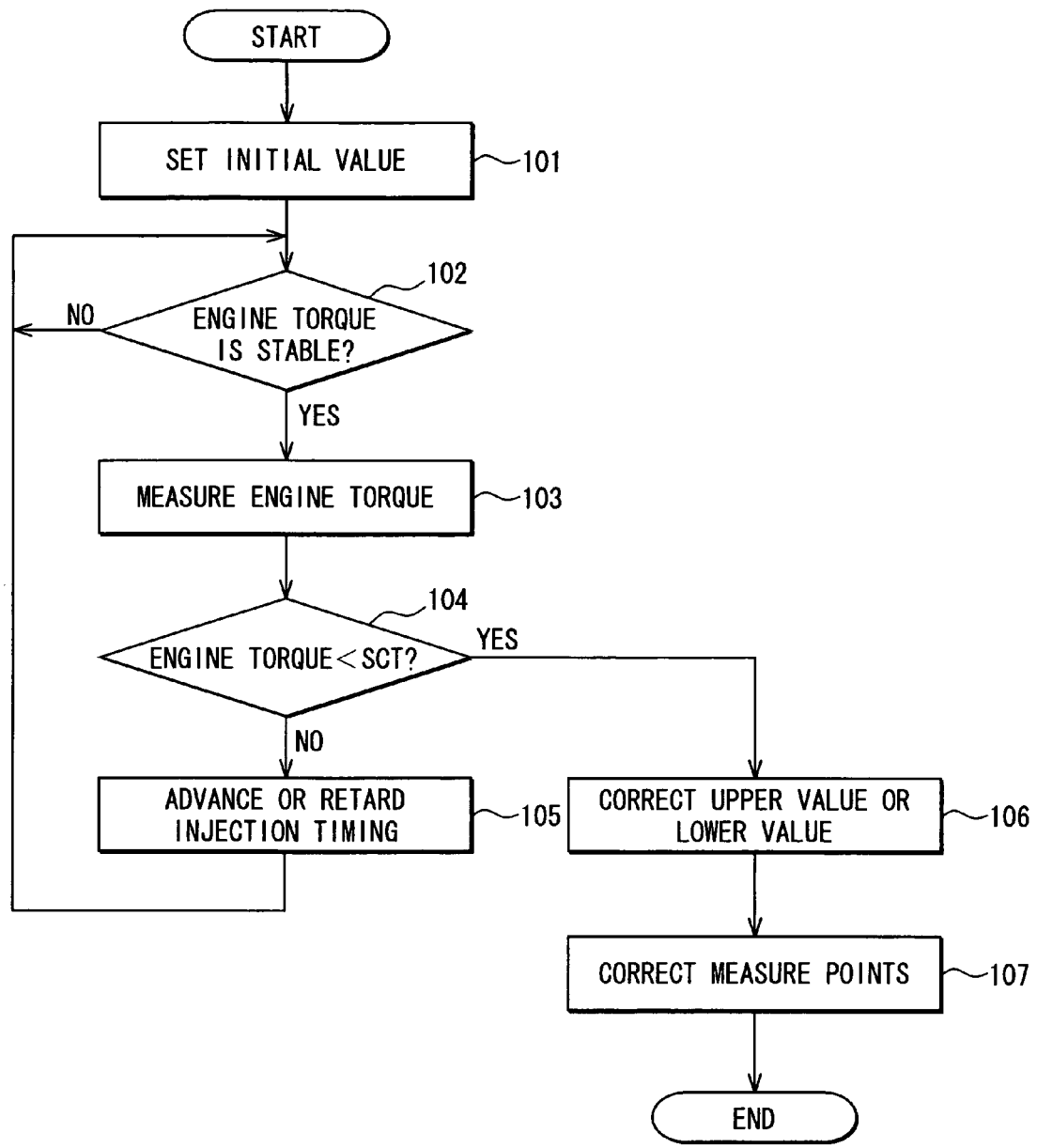
FIG. 5 is a flowchart showing processes of a measuring range correction program.

In consideration of this point, the adaptation-control computer 17 executes a measuring range correction program shown in FIG. 5. The fuel injection timing is varied gradually near the upper and lower limit values of the measuring range of fuel injection timing. A measuring process of the engine characteristic data is repeated. The measuring range of the fuel injection timing is corrected based on the measuring result so that the combustion state becomes stable. The measure points can be certainly arranged only in a rage where the combustion state is stable.

When the fuel injection timing is varied near the upper and lower limit values of the measuring range, a time period until the engine characteristic data becomes stable is defined as a waiting time. The waiting time is used as the index by which it is evaluated whether the combustion state is stable. When the waiting time is passed, the fuel injection timing is varied to measure the engine characteristic data. Hence, it is possible to efficiently determine whether the combustion state is stable near the upper and lower limit values of the measuring range of fuel injection timing In the present embodiment, the engine torque is used as the engine characteristic data which are the index for evaluating the combustion state. Since the engine torque will fall immediately if the combustion state deteriorates, it can be determined whether the combustion state deteriorates by the depression of the engine torque.

Furthermore, when the measuring range of fuel injection timing is corrected to the range in which the combustion state becomes stable, the measure points of the design of experiments are corrected according to the measuring range after correction. Since the measure points can be arranged in the optimal position in the measuring range after correction, adaptation accuracy can be improved.

The adaptation-control computer 17 executes the correction of the measuring range of fuel injection timing according to a measuring range correction program shown in FIG. 5. In step 101, an initial value of the fuel injection timing is established close to the upper (or lower) limit value in the measuring range refined based on the simulation result. The engine 11 is driven at this fuel injection timing. In step 102, it is waited until a time period required for the engine torque to be stable has passed, which is the index for evaluating whether the combustion state is stable. That is, it is determined whether the engine torque is stable.

When the answer is Yes in step 102, the procedure proceeds to step 103 in which the engine torque is measured. In step 104, it is determined whether the measured engine torque is less than a stable combustion threshold (SCT). When the answer is No, it is determined that the combustion state is stable and the procedure proceeds to step 105. In step 105, the fuel injection timing is advanced or retarded in a direction that the fuel injection timing approaches the upper (or lower) limit value in the measuring range. And, the processes in steps 102-104 are repeatedly performed. As mentioned above, the waiting time is defined as a time period for the engine torque to become stable. At every time when the waiting time has passed, the fuel injection timing is advanced or retarded to approach the upper (or lower) limit value, the engine torque is measured, and it is determined whether the engine torque is less than SCT.

When the answer is Yes in step 104, that is, when the fall of the engine torque is detected, it is determined that the combustion state deteriorates and the procedure proceeds to step 106. In step 106, the upper (or lower) value in the measuring range is corrected to the previous fuel injection timing where no fall of engine torque is detected. Thereby, the range where the combustion state deteriorates is excluded from the measuring range of fuel injection timing, and the measuring range of fuel injection timing is refined only to the range in which the combustion state becomes stable. Then, the procedure proceeds to step 107 in which the measure points in the design of experiments method are corrected in the corrected measuring range The structure of the fuel-injection-timing adaptation apparatus is not limited to that shown in FIG. 1.

What is claimed is:

1. A fuel-injection-timing adaptation method for a direct injection engine, wherein an engine characteristic data is repeatedly measured by changing a fuel injection timing at a plurality of measure points which are arranged in a predetermined measuring range in order to compute an adaptation value of the fuel injection timing based on measure data at each measure point, the method comprising:
    simulating a relationship between a behavior of a fuel spray injected into a cylinder through a fuel injector and a fuel injection timing based on design data of the engine and the fuel injector; and
    refining the measuring range of the fuel injection timing to a range in which a combustion state is stable based on a simulation result.

2. A fuel-injection-timing adaptation method according to claim 1, wherein
    a relationship between a fuel-rate of fuel colliding with an inner surface of a cylinder and the fuel injection timing is simulated based on the design data of the engine and the fuel injector, and
    the measuring range of the fuel injection timing is refined based on the simulation result.

3. A fuel-injection-timing adaptation method according to claim 1, wherein
    a relationship between a fuel-rate of fuel colliding with a cavity formed on a top surface of a piston and the fuel injection timing is simulated based on the design data of the engine and the fuel injector, and
    the measuring range of the fuel injection timing is refined based on the simulation result.

4. A fuel-injection-timing adaptation method according to claim 1, wherein
    a relationship between a fuel-rate of fuel colliding with an inner surface of a cylinder, a fuel-rate of fuel colliding with a cavity formed on a top surface of the piston and the fuel injection timing is simulated based on the design data of the engine and the fuel injector, and
    the measuring range of the fuel injection timing is refined based on the simulation result.

5. A fuel-injection-timing adaptation method according to claim 1, wherein
    a measuring operation of the engine characteristic data is repeated with the fuel injection timing gradually varied near an upper and a lower limit value in the measuring range refined based on the simulation result, and
    the measuring range of the fuel injection timing is corrected based on the measured result so that a combustion state becomes stable.

6. A fuel-injection-timing adaptation method according to claim 5, wherein
    when the fuel injection timing is varied around the upper and the lower value in the measuring range, a waiting time is defined as a time period required for the engine characteristic data to become stable, the engine characteristic data being an index to evaluate whether the combustion state is stable, and
    at every time when the waiting time has passed, the fuel injection timing is varied to measure the engine characteristic data.

7. A fuel-injection-timing adaptation method according to claim 6, wherein the engine characteristic data represent an engine torque.

8. A fuel-injection-timing adaptation method according to claim 5, wherein
    when the measuring range of the fuel injection timing is corrected so that the combustion state becomes stable, the measure points are corrected according to the corrected measuring range.

9. A fuel-injection-timing adaptation method according to claim 1, wherein
    information of the behavior of the fuel spray indicative of a stable combustion is stored in a memory means, and
    the measuring rage of fuel injection timing of an engine having different design data is refined based on the stored information and the simulation result.

10. A fuel-injection-timing adaptation apparatus for a direct injection engine, wherein an engine characteristic data is repeatedly measured by changing a fuel injection timing at a plurality of measure points which are arranged in a predetermined measuring range in order to compute an adaptation value of the fuel injection timing based on measure data at each measure point, the apparatus comprising:
    a simulation means for simulating a relationship between a behavior of a fuel spray injected into a cylinder through a fuel injector and a fuel injection timing based on design data of the engine and the fuel injector; and a refine means for refining the measuring range of the fuel injection timing to a range in which a combustion state is stable based on a simulation result.

11. A fuel-injection-timing adaptation apparatus according to claim 10, wherein
the simulation means simulates a relationship between a fuel-rate of fuel colliding with an inner surface of a cylinder and the fuel injection timing based on the design data of the engine and the fuel injector, and
the refine means refines the measuring range of the fuel injection timing based on the simulation result.

12. A fuel-injection-timing adaptation apparatus according to claim 10, wherein
the simulation means simulates a relationship between a fuel-rate of fuel colliding with a cavity formed on a top surface of a piston and the fuel injection timing based on the design data of the engine and the fuel injector, and
the refine means refines the measuring range of the fuel injection timing based on the simulation result.

13. A fuel-injection-timing adaptation apparatus according to claim 1, wherein
the simulation means simulates a relationship between a fuel-rate of fuel colliding with an inner surface of a cylinder, a fuel-rate of fuel colliding with a cavity formed on a top surface of a piston, and the fuel injection timing based on the design data of the engine and the fuel injector, and
the refine means refines the measuring range of the fuel injection timing based on the simulation result.

14. A fuel-injection-timing adaptation apparatus according to claim 10, wherein
a measuring operation of the engine characteristic data is repeated with the fuel injection timing gradually varied near an upper and a lower limit value in the measuring range refined based on the simulation result, and further comprising a correction means for correcting the measuring range of the fuel injection timing based on the measured result so that a combustion state becomes stable.

15. A fuel-injection-timing adaptation apparatus according to claim 14, wherein
when the fuel injection timing is varied around the upper and the lower value in the measuring range, a waiting time is defined as a time period required for the engine characteristic data to become stable, the engine characteristic data being an index to evaluate whether the combustion state is stable, and
at every time when the waiting time has passed, the fuel injection timing is varied to measure the engine characteristic data.

16. A fuel-injection-timing adaptation apparatus according to claim 15, wherein the engine characteristic data represent an engine torque.

17. A fuel-injection-timing adaptation apparatus according to claim 14, further comprising a measure point correction means for correcting the measure points according to the corrected measuring range when the measuring range of the fuel injection timing is corrected so that the combustion state becomes stable.

18. A fuel-injection-timing adaptation apparatus according to claim 10, further comprising a memory means for storing information of the behavior of the fuel spray indicative of a stable combustion, wherein the refine means refines the measuring rage of fuel injection timing of an engine having different design data based on the stored information and the simulation result.

* * * * *